(12) United States Patent
Schulte et al.

(10) Patent No.: US 9,170,126 B2
(45) Date of Patent: Oct. 27, 2015

(54) AVIONICS NAVIGATION POWER RANGE INDICATOR

(71) Applicant: Garmin International, Inc., Olathe, KS (US)

(72) Inventors: Christopher E. P. Schulte, Independence, OR (US); Douglas E. Leeper, Jr., Molalla, OR (US)

(73) Assignee: Garmin International, Inc., Olathe, KS (US)

( * ) Notice: Subject to any disclaimer, the term of this patent is extended or adjusted under 35 U.S.C. 154(b) by 132 days.

(21) Appl. No.: 13/973,555

(22) Filed: Aug. 22, 2013

(65) Prior Publication Data

US 2014/0336921 A1 Nov. 13, 2014

Related U.S. Application Data

(60) Provisional application No. 61/822,061, filed on May 10, 2013.

(51) Int. Cl.
*G01C 21/00* (2006.01)
*G01C 23/00* (2006.01)
*G01C 21/30* (2006.01)

(52) U.S. Cl.
CPC .................................... *G01C 23/005* (2013.01)

(58) Field of Classification Search
CPC ........ G01C 21/32; G01C 21/26; G01C 21/20; G09B 29/106
USPC .................................................. 701/408, 409
See application file for complete search history.

(56) References Cited

U.S. PATENT DOCUMENTS

| | | | | |
|---|---|---|---|---|
| 6,329,387 | B2 * | 12/2001 | Verner | 514/301 |
| 6,573,841 | B2 * | 6/2003 | Price | 340/963 |
| 6,804,585 | B2 * | 10/2004 | Humbard et al. | 701/3 |
| 7,167,782 | B2 | 1/2007 | Humbard et al. | 701/3 |
| 7,874,521 | B2 * | 1/2011 | Shuster | 244/175 |
| 8,027,758 | B2 * | 9/2011 | Ferro et al. | 701/18 |
| 8,032,267 | B1 * | 10/2011 | Simon | 701/4 |
| 8,035,547 | B1 * | 10/2011 | Flanigan et al. | 342/36 |
| 8,140,260 | B2 * | 3/2012 | Feyereisen et al. | 701/436 |
| 8,457,889 | B2 * | 6/2013 | Feyereisen et al. | 701/467 |
| 2013/0106190 | A1 * | 5/2013 | Lin et al. | 307/64 |

* cited by examiner

*Primary Examiner* — Ian Jen
(74) *Attorney, Agent, or Firm* — Samuel M. Korte; Maxwell M. Ali (57) ABSTRACT

An electronic device is described that includes a range indicator for conveying a range of travel until the electronic device ceases operation due to loss of power. In implementations, the electronic device includes a display device, a memory operable to store one or more modules, and at least one processor coupled to the display device and the memory. The processor is operable to execute the one or more modules to cause display of navigation information at the display device. The navigation information includes a map graphic representing an area an aircraft is traversing. The navigation information also includes an end of use situation that represents a range of travel for the aircraft until the electronic device ceases operation due to a loss of power.

24 Claims, 9 Drawing Sheets

AVIONICS NAVIGATION POWER RANGE INDICATOR

CROSS-REFERENCE TO RELATED APPLICATIONS

This application claims priority to U.S. Provisional Application No. 61/822,061 filed on May 10, 2013, entitled: "Avionics Navigation Travel Range Indicator", which is hereby incorporated by reference in its entirety.

BACKGROUND

Integrated avionics systems replace mechanical and electro-mechanical instrument gauges historically used in aircraft with one or more electronic displays for displaying primary flight information such as attitude, altitude, heading, vertical speed, and so forth, to the pilot. Integrated avionics systems may include one or more primary flight displays (PFD) and one or more multifunction displays (MFD). A representative PFD displays primary flight and selected navigation information that is typically received from one or more sensor systems such as an attitude heading reference system (AHRS), an inertial navigation system (INS), one or more air data computers (ADC), and/or navigation sensors. A representative MFD displays information for navigation and for broad situational awareness such as navigation routes, flight plans, information about aids to navigation (including airports), moving maps, weather information, terrain and obstacle information, traffic information, engine and other aircraft systems information, and so forth.

SUMMARY

An electronic device is described that includes a range indicator for conveying a range of travel until the electronic device ceases operation due to loss of power. In implementations, the electronic device includes a display device, a memory operable to store one or more modules, and at least one processor coupled to the display device and the memory. The processor is operable to execute the one or more modules to cause display of navigation information at the display device. The navigation information includes a map graphic representing an area an aircraft is traversing. The navigation information may also include an end of use situation that represents a range of travel for the aircraft until the electronic device ceases operation due to a loss of power.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Electronic devices, such as integrated avionics systems and mobile electronic devices, are typically utilized by one or more members of a flight crew (e.g., the pilot and/or the co-pilot) to navigate an aircraft. Integrated avionics systems may employ primary flight display(s) (PFDs) and multifunction display(s) (MFDs) to furnish primary flight control, navigational, and other information to the flight crew of the aircraft. Additionally, the integrated avionics systems may also employ an avionics control and display unit (CDU) that is configured to provide control functionality to the PFD and/or the MFD and to convey navigation information representing an area the aircraft is traversing. The flight crew may also utilize mobile electronic devices within the aircraft for conveying navigation information. The PFDs, MFDs, and CDUs ("integrated flight displays") are typically powered by the primary power source of the aircraft, and the mobile electronic devices are typically powered by a rechargeable power source, such as a battery. In the instance of the integrated flight displays, the aircraft may lose a portion of the primary power source, such as in the event of an electrical system failure, electrical generation failure, or other equipment failure. In these events, one or more of the integrated flight displays may then be powered by a back-up power source, such as a back-up battery. The back-up battery may be internal to the unit or a separate component of the system. The electrical power provided by the back-up power source may be a stored battery or a rechargeable battery. The power source is limited to a known, measured or calculated level.

Accordingly, an electronic device is described that includes range indicator functionality for conveying a range of travel until the electronic device ceases operation due to loss of power. In implementations, the electronic device includes a display device, a memory operable to store one or more modules, and at least one processor coupled to the display device and the memory. For example, the electronic device may be component of the avionics integrated systems, such as one or more of the integrated flight displays, or a mobile electronic device, such as a tablet computing device, a smartphone, a portable avionics device, or the like. The processor is operable to execute the one or more modules to cause display of navigation information at the display device. The navigation information may include a map graphic representing an area an aircraft is traversing. The navigation information may also include an end of use situation that represents a range of travel for the aircraft until the electronic device ceases operation due to a loss of power. In one or more implementations, the modules are configured to cause the processor to alter one or more display attributes of the navigation information. For example, a first region of the map graphic may be represented with a first display attribute, such as a first hue, and a second region of the map graphic may be represented with a second display attribute, such as a second hue. The first display attribute may represent destinations within the respective regions that the aircraft may reach before the electronic device ceases to operate due to the limited power supply, and the second display attribute may represent destinations for which the aircraft cannot reach before the electronic device ceases to operate.

Example Implementations

Figure 1A:
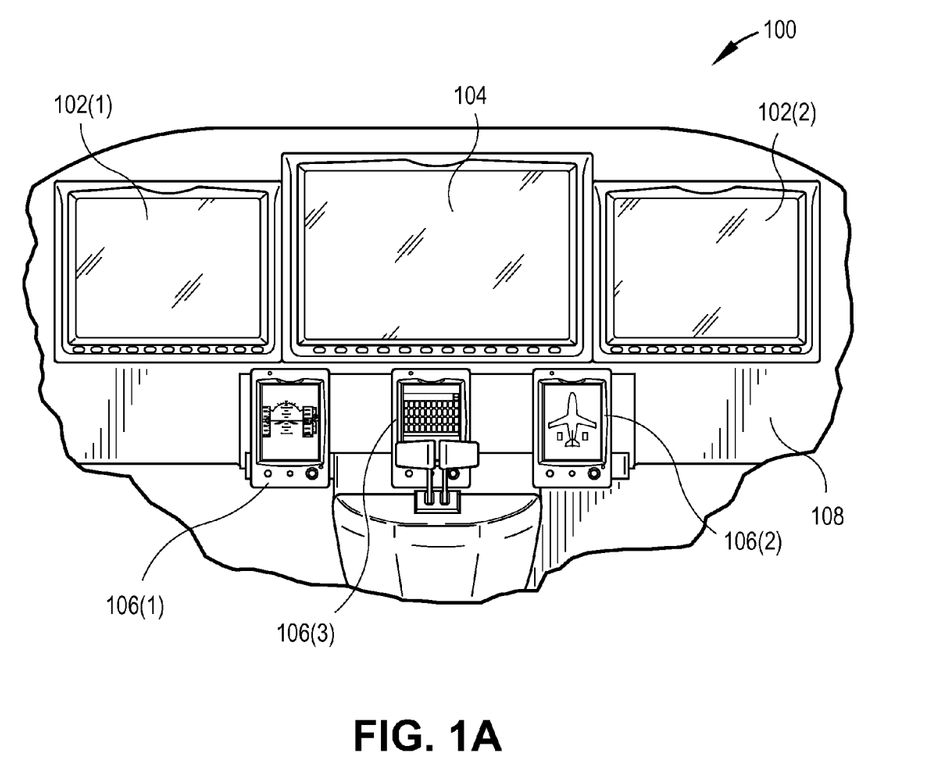
FIG. 1A is an illustration depicting a representative example instrument panel of an aircraft including an integrated avionics system configured in accordance with various implementations of the present disclosure.
Figure 1B:
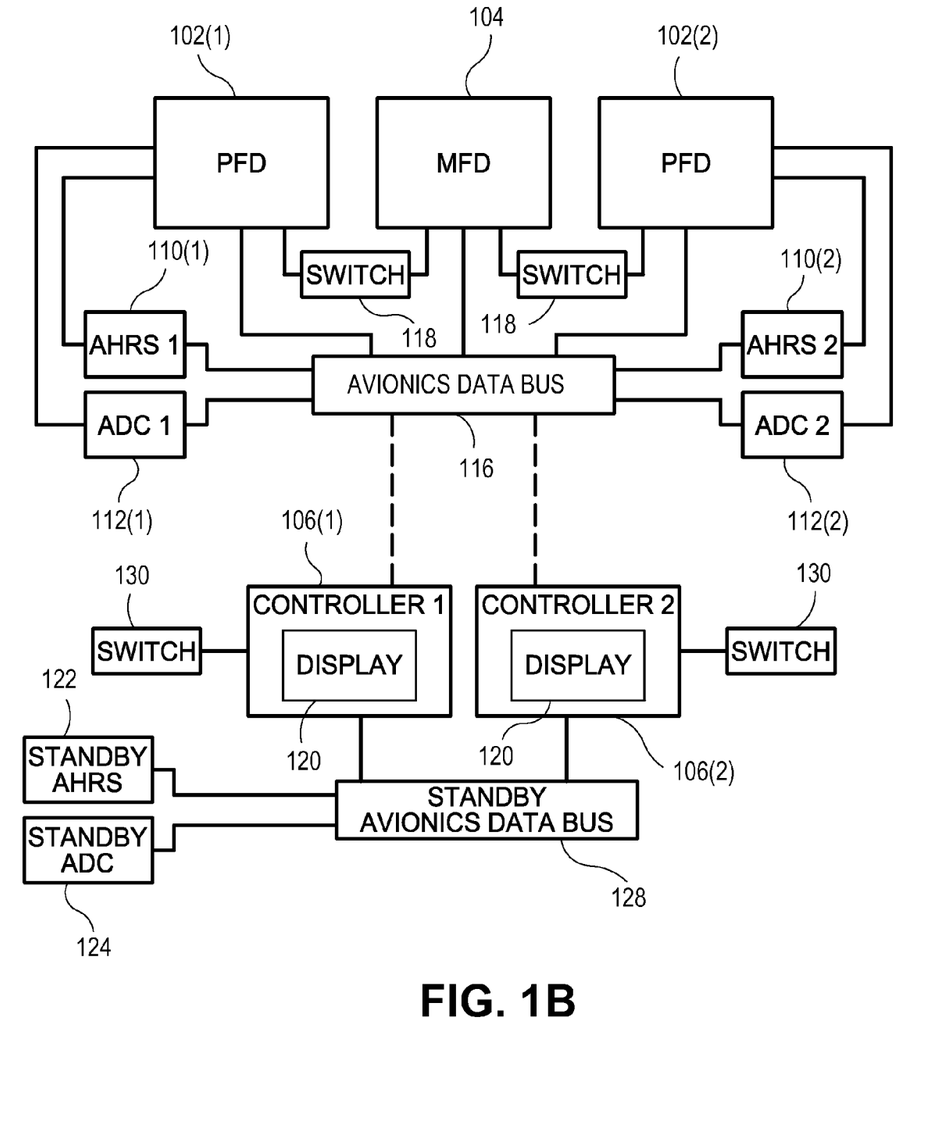
FIG. 1B is a block diagram depicting an implementation of the example integrated avionics system shown in FIG. 1A.

FIGS. 1A and 1B illustrate an example implementation of an integrated avionics system 100 within an aircraft. The integrated avionics system 100 may include one or more primary flight displays (PFDs) 102, one or more multifunction displays (MFD) 104, and one or more multi-product avionics control and display units (CDU) 106. For instance, in the implementation illustrated in FIG. 1A, the integrated avionics system 100 may be configured for use in an aircraft that is flown by two pilots (e.g., a pilot and a copilot). In this implementation, the integrated avionics system 100 may include a first PFD 102(1), a second PFD 102(2), an MFD 104, a first CDU 106(1), a second CDU 106(2), and a third CDU 106(3) that are mounted in the aircraft's instrument panel 108. As shown, the MFD 104 is mounted generally in the center of the instrument panel 108 so that it may be accessed by either pilot (e.g., by either the pilot or the copilot). The first PFD 102(1) and the first CDU 106(1) are mounted in the instrument panel 108 generally to the left of the MFD 104 for viewing and access by the pilot. Similarly, the second PFD 102(2) and the second CDU 106(2) are mounted in the instrument panel 108 generally to the right of the MFD 104 for viewing and access by the aircraft's copilot or other crew member or passenger. The third CDU 106(3) may be mounted between the first and second CDUs 106(1), 106(2). In implementations, the CDUs 106 may be positioned within the instrument panel 108 so that they may be readily viewed and/or accessed by the pilot flying the aircraft (which could be either the pilot or copilot).

The PFDs 102 may be configured to display primary flight information, such as aircraft attitude, altitude, heading, vertical speed, and so forth. In implementations, the PFDs 102 may display primary flight information via a graphical representation of basic flight instruments such as an attitude indicator, an airspeed indicator, an altimeter, a heading indicator, a course deviation indicator, and so forth. The PFDs 102 may also display other information providing situational awareness to the pilot such as terrain information, ground proximity warning information, and so forth.

As shown in FIG. 1B, primary flight information may be generated by one or more flight sensor data sources including, for example, one or more attitude, heading, angular rate, and/or acceleration information sources such as attitude and heading reference systems (AHRS) 110, one or more air data information sources such as air data computers (ADCs) 112, and/or one or more angle of attack information sources. For instance, the AHRSs 110 may be configured to provide information such as attitude, rate of turn, slip and skid; while the ADCs 112 may be configured to provide information including airspeed, altitude, vertical speed, and outside air temperature. Other configurations are possible.

Integrated avionics units (IAUs) may aggregate the primary flight information from the AHRS 110 and ADC 112 and provide the information to the PFDs 102 via an avionics data bus 116. The IAUs may also function as a combined communications and navigation radio. For example, the IAUs may include a two-way VHF communications transceiver, a VHF navigation receiver with glide slope, a global positioning system (GPS) receiver, and so forth. As shown, each integrated avionics unit may be paired with a primary flight display, which may function as a controlling unit for the integrated avionic unit. In implementations, the avionics data bus 116 may comprise a high speed data bus (HSDB), such as data bus complying with ARINC 429 data bus standard promulgated by the Airlines Electronic Engineering Committee (AEEC), a MIL-STD-1553 compliant data bus, and so forth.

The MFD 104 displays information describing operation of the aircraft such as navigation routes, moving maps, engine gauges, weather radar, ground proximity warning system (GPWS) warnings, traffic collision avoidance system (TCAS) warnings, airport information, and so forth, that are received from a variety of aircraft systems via the avionics data bus 116.

In implementations, the integrated avionics system 100 employs redundant sources of primary flight information to assure the availability of the information to the pilot, and to allow for cross-checking of the sources of the information. For example, the integrated avionics system 100 illustrated in FIGS. 1A through 2 employs two PFDs 102 that receive primary flight information from redundant AHRSS 110 and ADCs 112 via redundant IAUs. The integrated avionics system 100 is configured so that the first PFD 102(1) receives a first set of primary flight information aggregated by a first IAU from a first AHRS 110(1) and ADC 112(1). Similarly, the second PFD 102(2) receives a second set of primary flight information aggregated by a second IAU from a second AHRS 110(2) and ADC 112(2). Additionally, although a single avionics data bus 116 is illustrated in FIG. 1B, it is contemplated that redundant data buses may be employed for communication between the various components of the integrated avionics system 100.

In implementations, primary flight information provided by either the first AHRS 110(1) and ADC 112(1) or the second AHRS 110(2) and ADC 112(2) may be displayed on either PFD 102(1) or 102(2), or on the MFD 104 upon determining that the primary flight information received from either AHRS 110 and ADC 112 is in error or unavailable. Reversionary switches 118 may be selected by the pilot to configure the PFDs 102 or MFD 104 to display primary flight information from either the first AHRS 110(1) and ADC 112(1) or the second AHRS 110(2) and ADC(2). One or both of the PFDs 102 may also be configured to display information shown on the MFD 104 (e.g., engine gauges and navigational information), such as in the event of a failure of the MFD 104.

The integrated avionics system 100 may employ cross-checking of the primary flight information (e.g., attitude information, altitude information, etc.) to determine if the primary flight information to be furnished to either of the PFDs 102 is incorrect. In implementations, cross-checking may be accomplished through software-based automatic continual comparison of the primary flight information provided by the AHRS 110 and ADC 112. In this manner, a "miss-compare" condition can be explicitly and proactively annunciated to warn the pilot when attitude information displayed by either PFD 102 sufficiently disagrees. The CDUs 106 may furnish a general purpose pilot interface to control the aircraft's avionics. For example, the CDUs 106 allow the pilots to control various systems of the aircraft such as the aircraft's autopilot system, navigation systems, communication systems, engines, and so on, via the avionics data bus 116. In implementations, the CDUs 106 may also be used for control of the integrated avionics system 100 including operation of the PFD 102 and MFD 104. In implementations, one or both of the CDUs 106 may include a display 120. The display 120 of the CDU 106 may be used for the display of information suitable for use by the pilot of the aircraft to control a variety of aircraft systems. Further, as discussed in greater detail herein below, the display 120 of the CDU may be configured to display a cursor control area to facilitate manipulation of indicia displayed by a display device of the avionics system (e.g., a PFD 102 or MFD 104) via touch input to the touch screen over the displayed cursor control area.

The CDUs 106 may be operable to provide independent standby primary flight information to the pilot. The CDUs 106 may be configurable to operate in a reversionary mode to provide standby primary flight information to the pilot(s) of the aircraft. When operating in reversionary mode, the display 120 of the CDU 106 is used to display standby primary flight information. As shown in FIG. 1B, standby primary flight information, which may include information such as attitude, altitude, heading, vertical speed, and so forth, may be generated by a standby attitude and heading reference system (AHRS) 122 and a standby air data computer (ADC) 124. Data generated by AHRS 122 and ADC 124 may be provided to one or more of the CDUs 106 via a standby avionics data bus 128. In implementations, one or more mode switches 130 may be selected by the pilot to cause any number of the CDUs 106 to operate in the first mode to display standby primary flight information. While operating in the reversionary mode, the CDUs 106 may be disconnected from the avionics data bus 116 so that the CDUs 106 operate independently of and communicatively isolated from the primary components of the integrated avionics system 100 (e.g., the PFDs 102, the MFD 104, the AHRS 110, the ADCs 112, and so forth). For example, the CDUs 106 may not communicate with the avionics data bus 116 while in the first mode or may be physically disconnected from the avionics data bus 116 (e.g., via the mode switch 130, and so on).

Figure 2:
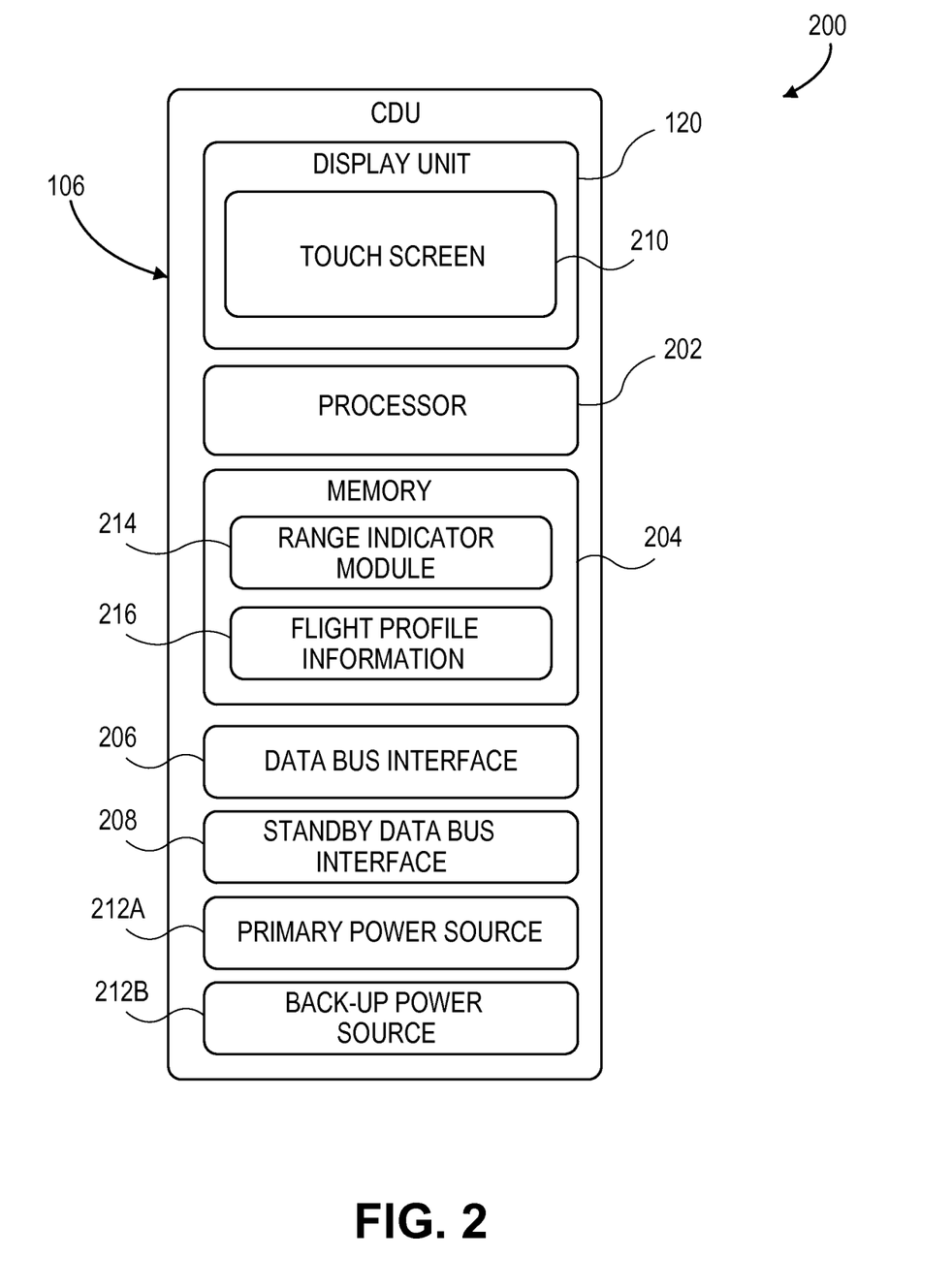
FIG. 2 is a block diagram depicting an example multi-product avionics control and display unit (CDU) suitable for use by the integrated avionics system shown in FIGS. 1A through 1B.

FIG. 2 illustrates a system 200 in an example implementation showing a representative CDU 106 of FIGS. 1A and 1B in greater detail. The CDU 106 is illustrated as including a processor 202, a memory 204, one or more avionics data bus interfaces 206, 208 and the display 120.

The processor 202 provides processing functionality for the CDU 106 and may include any number of processors, micro-controllers, or other processing systems and resident or external memory for storing data and other information accessed or generated by the CDU 106. The processor 202 may execute one or more software programs which implement techniques described herein. The processor 202 is not limited by the materials from which it is formed or the processing mechanisms employed therein, and as such, may be implemented via semiconductor(s) and/or transistors (e.g., electronic integrated circuits (ICs)), and so forth.

The memory 204 is an example of computer-readable media that provides storage functionality to store various data associated with the operation of the CDU 106, such as the software programs and code segments mentioned above, or other data to instruct the processor 202 and other elements of the CDU 106 to perform the functionality described herein. Although a single memory 204 is shown, a wide variety of types and combinations of memory may be employed. The memory 204 may be integral with the processor 202, stand-alone memory, or a combination of both. The memory 204 may include, for example, removable and non-removable memory elements such as RAM, ROM, Flash (e.g., SD Card, mini-SD card, micro-SD Card), magnetic, optical, USB memory devices, and so forth.

The avionics data bus interface 206 and the standby avionics data bus interface 208 furnish functionality to enable the CDU 106 to communicate with one or more avionics data buses such as the avionics data bus 116 and standby avionics data bus 128, respectively, illustrated in FIG. 1B. In various implementations, the avionics data bus interface 206 and standby avionics data bus interface 208 may include a variety of components, such as processors, memory, encoders, decoders, and so forth, and any associated software employed by these components (e.g., drivers, configuration software, etc.).

The display 120 displays information to the pilot of the aircraft. In implementations, the display 120 may comprise an LCD (Liquid Crystal Display) display, a TFT (Thin Film Transistor) LCD display, an LEP (Light Emitting Polymer or PLED (Polymer Light Emitting Diode)) display, a cathode ray tube (CRT), and so forth, capable of displaying text and graphical information. The display 120 may be backlit via a backlight such that it may be viewed in the dark or other low-light environments.

The display 120 may include a touch interface, such as a touch screen 210, that can detect a touch input within a specified area of the display 120 for entry of information and commands. In implementations, the touch screen 210 may employ a variety of technologies for detecting touch inputs. For example, the touch screen 210 may employ infrared optical imaging technologies, resistive technologies, capacitive technologies, surface acoustic wave technologies, and so forth. In implementations, buttons, keypads, knobs and so forth, may be used for entry of data and commands instead of or in addition to the touch screen 210.

As shown in FIG. 2, the system 200 (i.e., a CDU 106, a PFD 102, a MFD 104, combinations thereof, etc.) includes a back-up power source 212b, such as a back-up battery power source, that is configured to furnish power to at least partially power the system 200 in the event the aircraft loses primary power from a primary power source 212a (e.g., primary power sources 212a are no longer furnishing power to the PFDs 102, the MFD 104, the CDUs 106, and the instrument panel 108 of the aircraft). For example, the back-up power source 212b is configured to at least substantially power the system 200 when the aircraft is not powered by the primary power source 212a during operation of the aircraft. In an implementation, the back-up power source 212b comprises a battery that is configured to provide power to the CDU 106 when a loss of primary power is detected. For example, the back-up power source 212b may be configured to automatically furnish power to the CDU 106 once the primary power from the primary power source 212a ceases, or at least substantially ceases, to power the CDU 106 and/or the aircraft. In another example, the back-up power source 212b may be configured to power the CDU 106 upon the pilot/co-pilot manually causing the power source 212b to power the CDU 106. The back-up power source 212b is configured to furnish power to a CDU 106 for a minimum (in some configurations, pre-determined) amount of time to allow the pilot/co-pilot to utilize the CDU 106 for a limited amount of time while the primary power is not available within the aircraft.

Although the back-up power functionality described above uses the CDU 106 as an exemplary integrated flight display, the various back-up power and associated display functionalities described herein may be employed by any flight display or instrument, including PFD 102, MFD 104, CDU 106, other integrated and portable flight displays and instruments, combinations thereof, and the like. For instance, in one configuration, back-up power and associated range display functionality may be employed by any combination of the PFD 102, MFD 104, and CDU 106.

Figure 3:
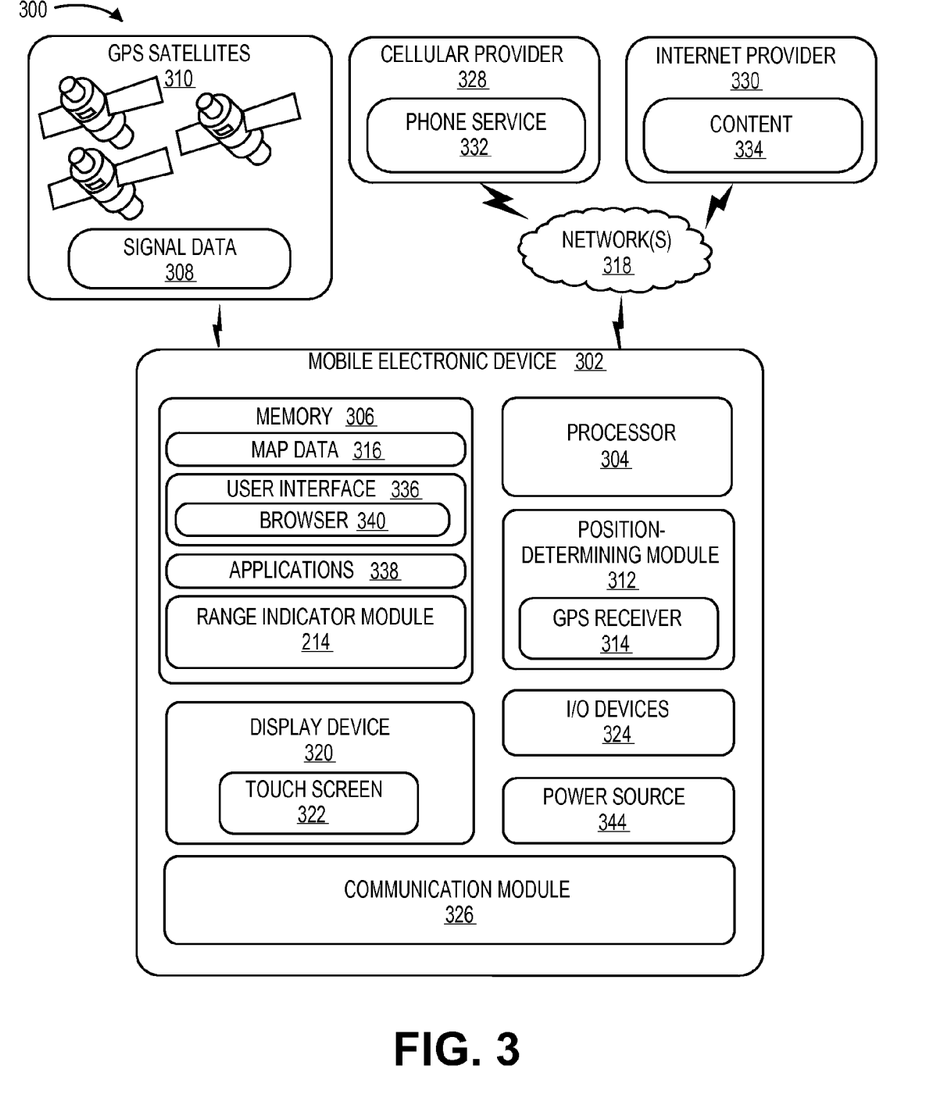
FIG. 3 is an example environment in which techniques may be implemented to configure a mobile electronic device providing avionic navigation information to furnish a end of use situation in accordance with an example implementation of the present disclosure.

FIG. 3 illustrates an example mobile electronic device environment 300 that includes a mobile electronic device 302 operable to provide a range of travel indication based upon the remaining battery power (i.e., the battery "life") utilized to power the mobile electronic device 302. The mobile electronic device 302 may be configured in a variety of ways. For instance, a mobile electronic device 302 may be configured as a portable navigation device (PND), a portable avionics device, a mobile phone, a smart phone, a position-determining device, a tablet device, a hand-held portable computer, a personal digital assistant, a multimedia device, a game device, combinations thereof, and so forth. In the following description, a referenced component, such as mobile electronic device 302, may refer to one or more entities, and therefore by convention reference may be made to a single entity (e.g., the mobile electronic device 302) or multiple entities (e.g., the mobile electronic devices 302, the plurality of mobile electronic devices 300, and so on) using the same reference number.

In FIG. 3, the mobile electronic device 302 is illustrated as including a processor 304 and a memory 306. The processor 304 provides processing functionality for the mobile electronic device 302 and may include any number of processors, micro-controllers, or other processing systems and resident or external memory for storing data and other information accessed or generated by the mobile electronic device 302. The processor 304 may execute one or more software programs that implement the techniques and modules described herein. The processor 304 is not limited by the materials from which it is formed or the processing mechanisms employed therein and, as such, may be implemented via semiconductor(s) and/or transistors (e.g., electronic integrated circuits (ICs)), and so forth.

The memory 306 is an example of device-readable storage media that provides storage functionality to store various data associated with the operation of the mobile electronic device 302, such as the software program and code segments mentioned above, or other data to instruct the processor 304 and other elements of the mobile electronic device 302 to perform the techniques described herein. Although a single memory 306 is shown, a wide variety of types and combinations of memory may be employed. The memory 306 may be integral with the processor 304, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the mobile electronic device 302, the memory 306 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The mobile electronic device 302 is further illustrated as including functionality to determine position. For example, mobile electronic device 302 may receive signal data 308 transmitted by one or more position data platforms and/or position data transmitters, examples of which are depicted as the GPS satellites 310. More particularly, mobile electronic device 302 may include a position-determining module 312 that may manage and process signal data 308 received from Global Positioning System (GPS) satellites 310 via a GPS receiver 314. The position-determining module 312 is representative of functionality operable to determine a geographic position through processing of the received signal data 308. The signal data 308 may include various data suitable for use in position determination, such as timing signals, ranging signals, ephemerides, almanacs, and so forth.

Position-determining module 312 may also be configured to provide a variety of other position-determining functionality. Position-determining functionality, for purposes of discussion herein, may relate to a variety of different navigation techniques and other techniques that may be supported by "knowing" one or more positions. For instance, position-determining functionality may be employed to provide position/location information, timing information, speed information, and a variety of other navigation-related data. Accordingly, the position-determining module 312 may be configured in a variety of ways to perform a wide variety of functions. For example, the position-determining module 312 may be configured for outdoor navigation, vehicle navigation, aerial navigation (e.g., for airplanes, helicopters), marine navigation, personal use (e.g., as a part of fitness-related equipment), and so forth. Accordingly, the position-determining module 312 may include a variety of devices to determine position using one or more of the techniques previously described.

The position-determining module 312, for instance, may use signal data 308 received via the GPS receiver 314 in combination with map data 316 that is stored in the memory 306 to show a current position on a map, and so on. Position-determining module 312 may include one or more antennas to receive signal data 308 as well as to perform other communications, such as communication via one or more networks 318 described in more detail below. The position-determining module 312 may also provide other position-determining functionality, such as to determine an average speed, calculate an arrival time, and so on.

Although a GPS system is described and illustrated in relation to FIG. 3, it should be apparent that a wide variety of other positioning systems may also be employed, such as other global navigation satellite systems (GNSS), terrestrial based systems (e.g., wireless-phone based systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros, odometers, and magnetometers), use of "dead reckoning" techniques, and so on.

The mobile electronic device 302 includes a display 320 to display information to a user of the mobile electronic device 302. In embodiments, the display 320 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display 320 may be backlit via a backlight such that it may be viewed in the dark or other low-light environments.

The display 320 may be provided with a touch screen 322 to receive input (e.g., data, commands, etc.) from a user. For example, a user may operate the mobile electronic device 302 by touching the touch screen 322 and/or by performing gestures on the screen 322. In some embodiments, the touch screen 322 may be a capacitive touch screen, a resistive touch screen, an infrared touch screen, combinations thereof, and the like. The mobile electronic device 302 may further include one or more input/output (I/O) devices 324 (e.g., a keypad, buttons, a wireless input device, a thumbwheel input device, a trackstick input device, and so on). The I/O devices 324 may include one or more audio I/O devices, such as a microphone, speakers, and so on.

The mobile electronic device 302 may also include a communication module 326 representative of communication functionality to permit mobile electronic device 302 to send/receive data between different devices (e.g., components/peripherals) and/or over the one or more networks 318. Communication module 326 may be representative of a variety of communication components and functionality including, but not limited to: one or more antennas; a browser; a transmitter and/or receiver; a wireless radio; data ports; software interfaces and drivers; networking interfaces; data processing components; and so forth.

The one or more networks 318 are representative of a variety of different communication pathways and network connections which may be employed, individually or in combinations, to communicate among the components of the environment 300. Thus, the one or more networks 318 may be representative of communication pathways achieved using a single network or multiple networks. Further, the one or more networks 318 are representative of a variety of different types of networks and connections that are contemplated including, but not limited to: the Internet; an intranet; a satellite network; a cellular network; a mobile data network; wired and/or wireless connections; and so forth.

Examples of wireless networks include, but are not limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth.

The mobile electronic device 302 through functionality represented by the communication module 326 may be configured to communicate via one or more networks 318 with a cellular provider 328 and an Internet provider 330 to receive mobile phone service 332 and various content 334, respectively. Content 334 may represent a variety of different content, examples of which include, but are not limited to: map data, which may include navigation information (i.e., avionics navigation information); flight plan information; web pages; services; music; photographs; video; email service; instant messaging; device drivers; instruction updates; and so forth.

The mobile electronic device 302 is illustrated as including a user interface 336, which is storable in memory 306 and executable by the processor 304. The user interface 336 is representative of functionality to control the display of information and data to the user of the mobile electronic device 302 via the display 320. In some implementations, the display 320 may not be integrated into the mobile electronic device and may instead be connected externally using universal serial bus (USB), Ethernet, serial connections, and so forth. The user interface 336 may provide functionality to allow the user to interact with one or more applications 338 of the mobile electronic device 302 by providing inputs via the touch screen 322 and/or the I/O devices 324. For example, the user interface 336 may cause an application programming interface (API) to be generated to expose functionality to an application 338 to configure the application for display by the display 320 or in combination with another display. In embodiments, the API may further expose functionality to configure the application 338 to allow the user to interact with an application by providing inputs via the touch screen 322 and/or the I/O devices 324.

Applications 338 may comprise software, which is storable in memory 306 and executable by the processor 304, to perform a specific operation or group of operations to furnish functionality to the mobile electronic device 302. Example applications may include cellular telephone applications, instant messaging applications, email applications, photograph sharing applications, calendar applications, address book applications, and so forth.

In implementations, the user interface 336 may include a browser 340. The browser 340 enables the mobile electronic device 302 to display and interact with content 334 such as a webpage within the World Wide Web, a webpage provided by a web server in a private network, and so forth. The browser 340 may be configured in a variety of ways. For example, the browser 340 may be configured as an application 338 accessed by the user interface 336. The browser 340 may be a web browser suitable for use by a full resource device with substantial memory and processor resources (e.g., a smart phone, a personal digital assistant (PDA), etc.). However, in one or more implementations, the browser 340 may be a mobile browser suitable for use by a low-resource device with limited memory and/or processing resources (e.g., a mobile telephone, a portable music device, a transportable entertainment device, etc.). Such mobile browsers typically conserve memory and processor resources, but may offer fewer browser functions than web browsers.

In one or more implementations, the mobile electronic device 302 may also be configured to interface with the integrated avionics system 100 within the aircraft. For example, the device 302 may interface with the system 100 to retrieve flight information, flight maps, and so forth, to allow the pilot to utilize the mobile electronic device 302 to assist in navigating the aircraft. For example, the pilot may utilize the device 302 to assist in navigating the aircraft to a destination in the event the integrated avionics system 100 is no longer operational due to a power failure.

As shown in FIG. 3, the mobile electronic device 302 includes a power source 344 that is configured to at least partially power the mobile electronic device 302. For example, the power source 344 is configured to at least substantially power the mobile electronic device 302. In an implementation, the power source 344 comprises a rechargeable power source, such as a battery, to at least substantially power the mobile electronic device 302 during operation of the device 302.

The system 200 and the mobile electronic device 300 are illustrated as including a range indicator module 214, which is storable in the memory 204 and executable by the processor 202. The range indicator module 214 is representative of functionality that causes the display of an end of use situation that represents when and/or where the respective integrated flight display or the device 302 may fail due to loss of power from the corresponding power source (i.e., the back-up power source 212*b* for the integrated flight displays or the power source 344 for the mobile electronic device 302). In an implementation, the range indicator module 214 is configured to cause one or more graphical representations (i.e., a range of travel) that convey, or depict, how far the aircraft can travel before the electronic device (i.e., one or more of the integrated flight displays or the mobile electronic device 302) has consumed at least substantially all of the power provided by the power source (e.g., power source 212*b*, power source 344). Thus, the module 214 is configured to cause generation and display of a visualization depicting how far the aircraft can travel before an electronic device utilized for navigational purposes may lose power.

Figure 4A:
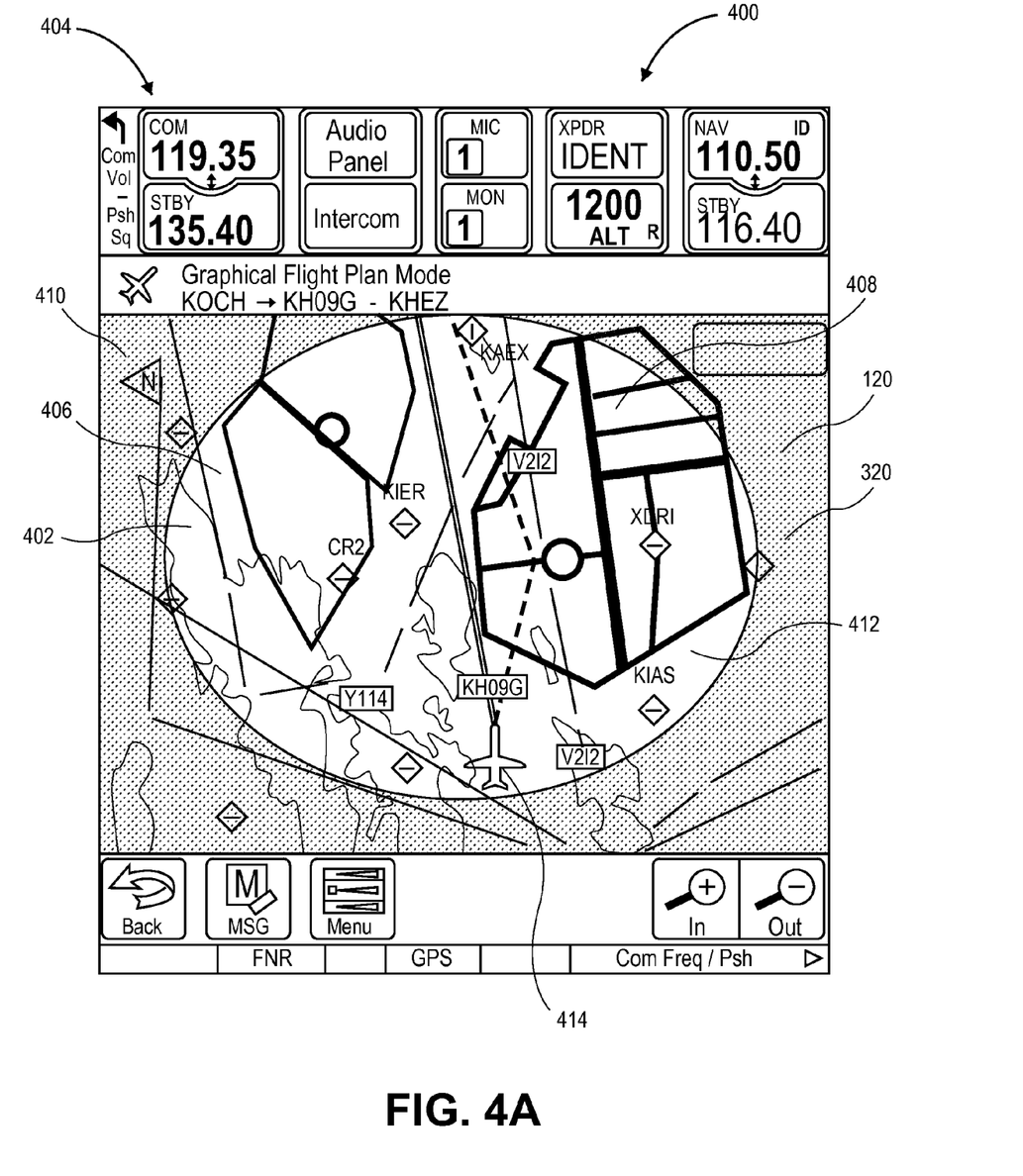
FIGS. 4A through 4C are illustrations of a display screen of an electronic device, such as the CDU shown in FIG. 2 or the mobile electronic device shown in FIG. 3, where various display attributes of navigational information, such as a map graphic, are altered to convey a visualization of an end of use situation representing how far an aircraft can travel before the electronic device ceases operations due to loss of power in accordance with an example implementation of the present disclosure.
Figure 4B:
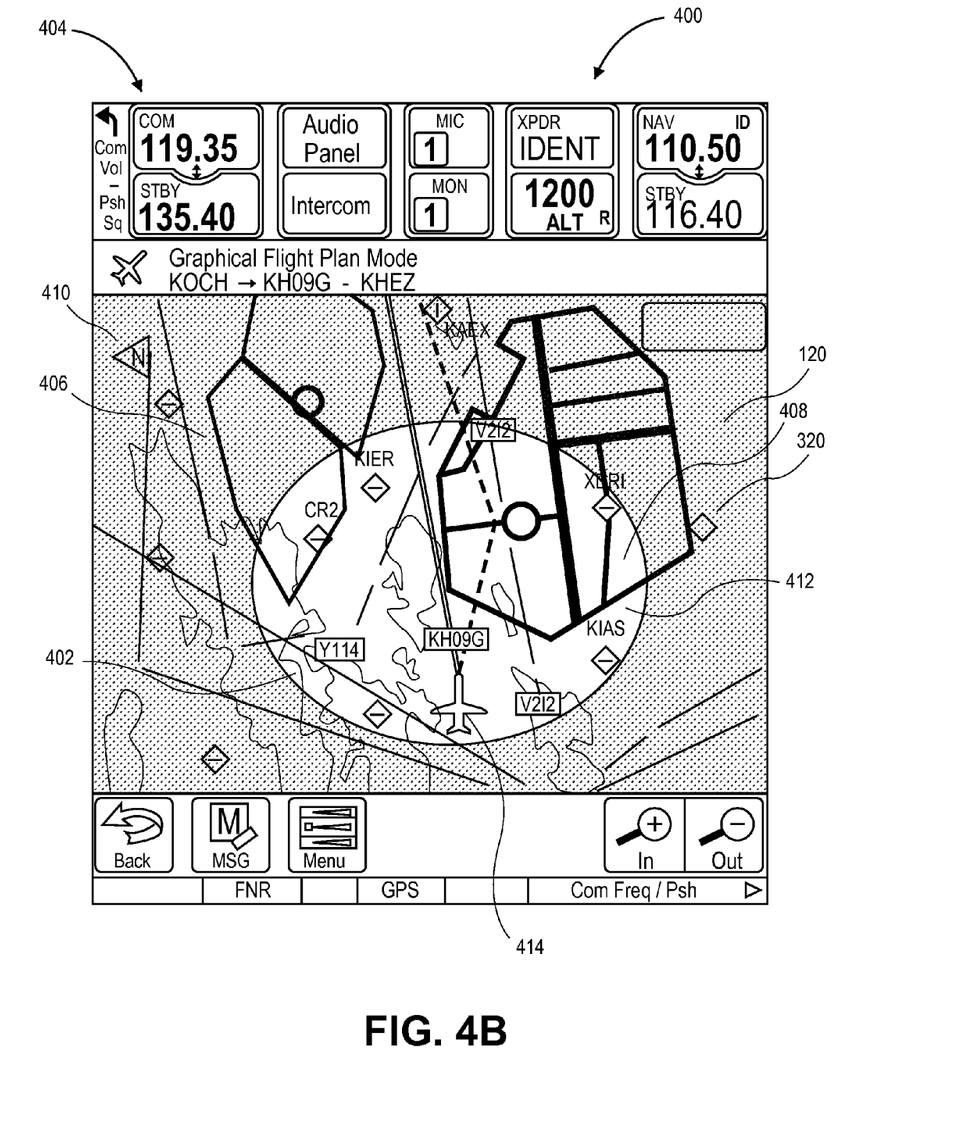
Figure 4C:
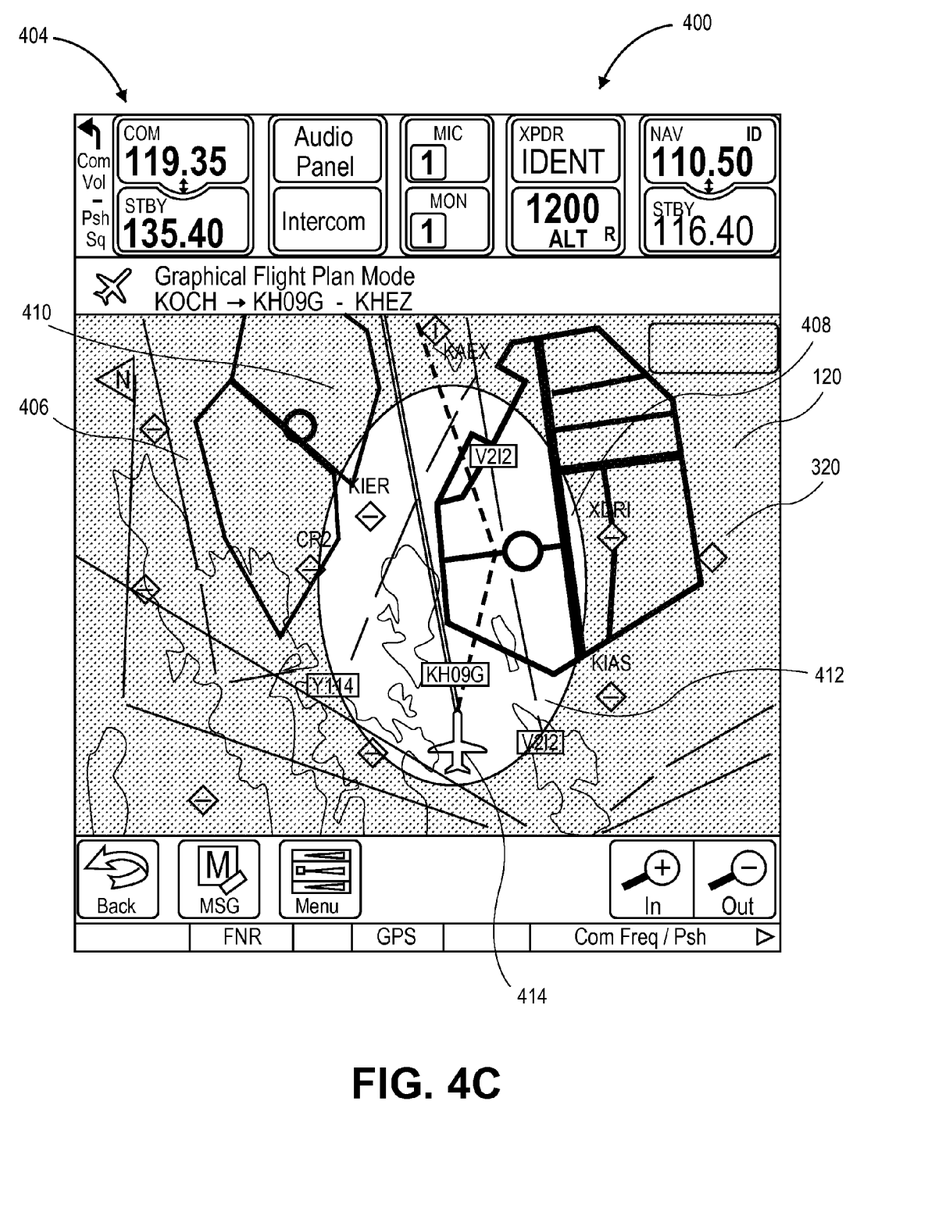
Figure 5:
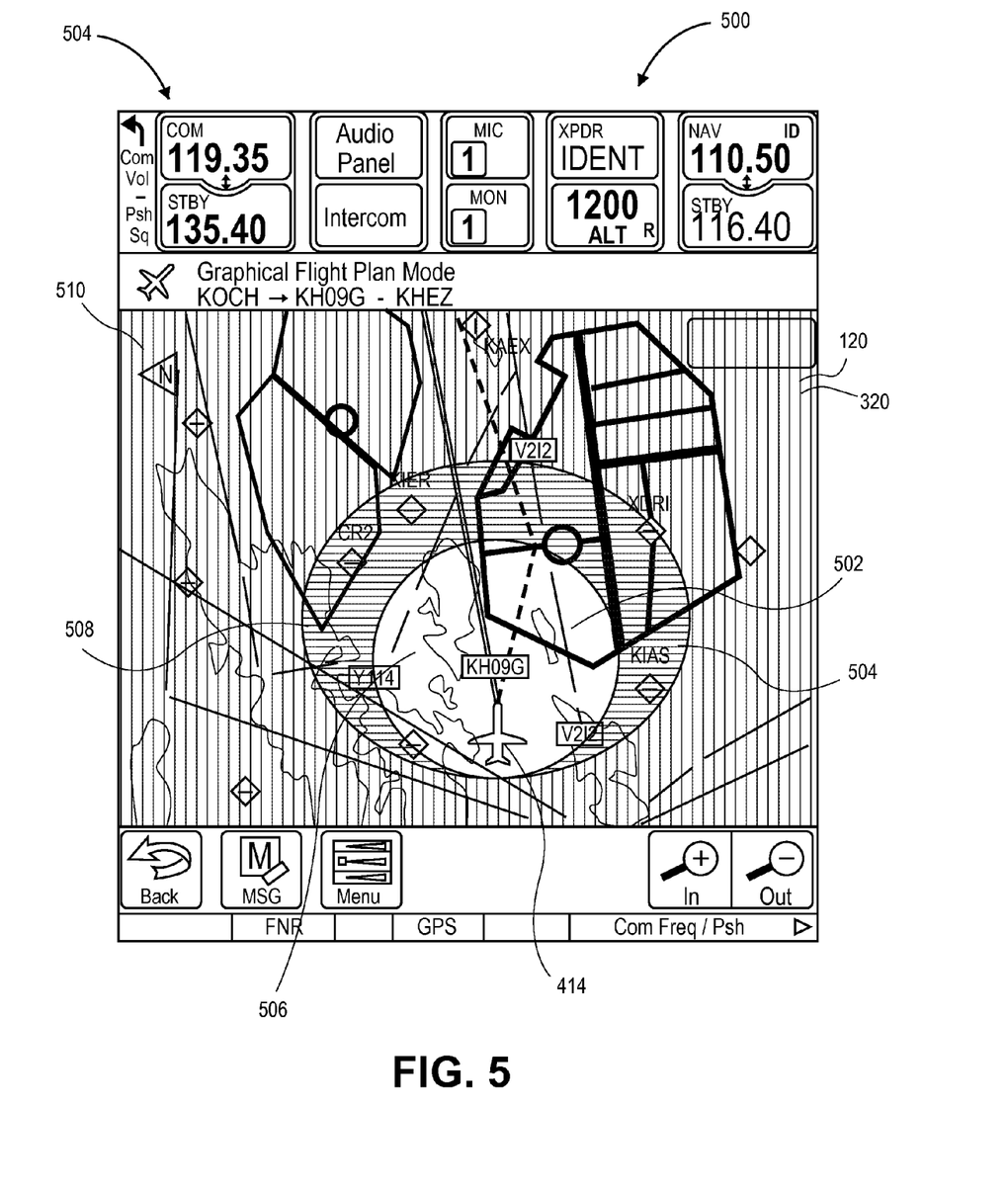
FIG. 5 is an illustration of another display screen of an electronic device, such as the CDU shown in FIG. 2 or the mobile electronic device shown in FIG. 3, where various display attributes of the navigation information is altered to convey a visualization of another end of use situation and the display attributes represent a probability range of the aircraft reaching a destination based upon when the electronic device may cease operation due to loss of power in accordance with another example implementation of the present disclosure.

In some instances, the range indicator module 214 is configured to cause the generation of one or more displays at a display screen, such as the display 120 of the CDU 106 or the display 320 of the mobile electronic device 302. FIGS. 4A through 5 illustrate example display screens 400, 500 of the display 120 of the CDU 106 or the display 320 of the mobile electronic device 302. As described above, the range indicator module 214 is configured to cause the display of an end of use situation 402 depicting when and/or where the integrated flight display(s) or the mobile electronic device 302 may cease to operate due to loss of power, which is described in greater detail herein.

As shown in FIGS. 4A through 4C, the display screen 400 may display navigation information 404, which may be retrieved via the map data 316 and/or the integrated avionics systems components, that represent information describing operation of the aircraft (e.g., navigation routes, moving maps, engine gauges, weather radar, ground proximity warning system (GPWS) warnings, traffic collision avoidance system (TCAS) warnings, airport information, and so forth). In one or more implementations of the present disclosure, the navigation information 404 includes a map 406 (e.g., map graphic) that is configured to convey a map region pertinent to navigation of the aircraft. For example, the map 406 may display graphical representations of an area that the aircraft is traversing. The map 406 may be configured to continually update at predetermined time intervals such that the graphical representations reflect the area being traversed with respect to movement of the aircraft (i.e., a moving map).

The range indicator module 214 is configured to cause the respective processor 202, 304 to generate an end of use situation 402, such as a loss of electrical power, within the map 406. As shown in FIGS. 4A through 4C, the end of use situation 402 may be represented as a range of travel 408 that the aircraft can potentially travel until the electronic device (i.e., the integrated flight displays or the mobile electronic device 302) ceases operation due to loss of power from the device's respective power source. For example, the module 214 is configured to cause display of a range of travel 408 that represents a visualization of the end of use situation 402 at the display 120 of the CDU 106. In another example, the module 214 is configured to cause display of a range of travel 408 that represents a visualization of the end of use situation 402 at the display 320 of the mobile electronic device 302.

As shown in FIGS. 4A through 4C, the range of travel may be depicted by altering the display characteristics of the navigation information 404. For example, the range indicator module 214 may be configured to cause a corresponding processor 202, 304 to alter the display characteristics of the graphics representing regions 410, or areas, outside the range of travel 408 with respect to the display characteristics representing regions 412 within the range of travel 408 (e.g., the circular region illustrated in FIGS. 4A through 4B and the oblong region illustrated in FIG. 4C). Attributes of navigation information 404 that may be altered (e.g., changed, modified, updated) comprise any discernible, visual aspect, feature, or characteristic of the navigation information 404 including, but not limited to, the hue (color) of the display characteristics of the graphics representing regions 410 outside the range of travel 408 with respect to the display characteristics representing regions 412 within the range of travel 408 or the brightness of the display characteristics of the graphics representing regions 410 outside the range of travel 408 with respect to the display characteristics representing regions 412 within the range of travel 408.

The range indicator module 214 is configured to cause display of the end of use situation 402 based upon at least one aircraft flight characteristic. For example, the module 214 is configured to alter the display characteristics of the navigation information 404 to furnish a visualization of the range of travel 408 based upon aircraft flight characteristics that include, but are not limited to, altitude of the aircraft, airspeed of the aircraft, flight plan of the aircraft, Winds Aloft (forecasted or calculated), terrain height (topography), navigational input of the aircraft (i.e., pilot provides a navigational input to the aircraft), and so forth. In one or more implementations, flight characteristic information is stored within flight profile information 216, which is storable in the memory 204 of the CDU 106 or the memory 306 of the mobile electronic device 302. The range indicator module 214 may calculate available range by dividing time by speed. However one or any number of additional parameters, including but not limited to those listed herein, can be utilized within the calculation.

For example, if the back-up power source 212*b* is capable of providing 15 minutes of power to the MFD 104 (or other flight display), the range indicator module 214 may calculate the distance the aircraft is capable of traveling within the next 15 minutes (range of travel 408) based upon the flight characteristics of the aircraft (current speed, altitude, etc.). In some configurations, the range of travel 408 may be calculated based on the glide characteristics of the aircraft—e.g., how far the aircraft can glide based on current altitude, attitude, airspeed, terrain, and glide ratio. Additionally or alternatively, the range of travel 408 may include an estimate of the aircraft's ability to accelerate, gain altitude, change attitude, or otherwise modify any of the flight characteristic information. The range indication may be dynamic, recomputed on a regular basis to give near real-time updates based upon the current inputs and or estimates of power usage, estimated storage reserves, aircraft dynamics, and other flight characteristic.

In some implementations, the module 214 is configured to at least substantially continually monitor the power consumption to dynamically update the range of travel 408 based upon the monitored power consumption. For example, as shown in FIG. 4B, the module 214 is configured to cause modification (e.g., update, alter, change) of the range of travel 408 based upon the power consumption of the aircraft. The module 214 is configured to cause a processor of the electronic device to monitor the remaining power utilized to power the electronic device. In turn, the module 214 is configured to cause the processor to update the range of travel 408 based upon the remaining power (e.g., remaining battery "life"). FIG. 4B illustrates a display screen 400 that provides a lesser range of travel 408 with respect to the range of travel 408 illustrated in FIG. 4A due to continued usage of the respective power source (i.e., the respective electronic device has consumed additional power with respect to the situation illustrated in FIG. 4B as compared to the situation illustrated in FIG. 4A).

Additionally, the module 214 is configured to update the range of travel 408 based upon the geographic position of the aircraft. In one or more implementations, the geographic position of the aircraft may be provided by one or more integrated avionics units in communication with the CDU 106 or the position-determining module 312 of the mobile electronic device 302.

While FIGS. 4A and 4B illustrate a range of travel 408 delineated as a circular shape, FIG. 4C illustrates a display screen 400 where the range of travel 408 is delineated as an oblong shape (e.g., display characteristics of the region 412 define an oblong shape with respect to the display characteristics of the region 410). In this implementation, the module 214 is configured to cause the display of the range of travel 408 based upon one or more navigational inputs provided to the aircraft. For instance, the display characteristics of the regions 412 may be altered to account for any extra power consumption due to a directional navigational input as compared to at least substantially no change in directional navigation (i.e., the electronic devices may consume extra power due to a change in direction of the aircraft as compared to no, or at least substantially no, change in direction of the aircraft).

As shown in FIG. 5, the range indicator module 214 may be configured to cause display of a range of travel having varying display characteristics to represent differing likelihoods of how far the aircraft (the aircraft is denoted in FIGS. 4A through 4C and 5 with graphical representation 414) can travel with an operational electronic device. In an implementation, the module 214 is configured to cause a corresponding processor 202, 304 to display an end of use situation 502 within the display 500 that include multiple varying display characteristics denoting a range of travel 504 based upon a probability the aircraft can arrive at a destination within one or more specified regions (e.g., regions 506, 508, 510) prior to loss of power to the corresponding electronic device. For example, the module 214 is configured to cause the generation and the display of a first region 506 having a first display characteristic within the range of travel 504. In this example, the first region 506 represents areas that the aircraft can arrive at a destination within the first region 506 within a first probability range (e.g., the aircraft has at or above a ninety percent (90%) likelihood of arriving at a destination within the first region 506 prior to loss of power to the electronic device). The module 214 may be configured to generate a second region 508 having a second display characteristic denoting that the aircraft can arrive at a destination within the second region 508 within a second probability range (e.g., the aircraft has between a fifty percent (50%) and an eighty-nine percent (89%) likelihood of arriving at a destination within the second region 508 prior to loss of power to the electronic device). The module 214 may also be configured to generate a third region 510 having a third display characteristic denoting that the aircraft can arrive at a destination within the third region 510 within a third probability range (e.g., the aircraft has between a five percent (5%) and a forty-nine percent (49%) likelihood of arriving at a destination within the third region 510 prior to loss of power to the electronic device). As described with respect to FIG. 4B, the module 214 may be configured to continually update the various regions according to the continued consumption of power by the electronic device during operation of the aircraft and according to the flight characteristics described above. It is understood that the module 214 may be configured to cause the display of more or less probability regions according to the requirements of the electronic device and/or the pilot's preferences. For example, in some configurations, the module 214 may utilize shading to differentiate between regions 506, 508, 510 such as by providing a gradual transition from light to dark as the likelihood of arriving at a displayed location decreases (e.g., nearby areas are unshaded, far areas are darkened, with a gradual continuum of shading therebetween). In some embodiments, the colors, levels, and types of shading may be user configurable.

In one or more implementations, range indicator module 214 is configured to cause a corresponding processor 202, 304 to generate a visual alert, or indication, to convey to the pilot or the co-pilot that the respective electronic device has entered an end of use situation mode of operation. For example, a pilot or a co-pilot may have caused the display of navigational information in such a manner that the end of use situation may be difficult to discern (i.e., the pilot or the co-pilot have zoomed-in or zoomed-out within the map 406 such that the end of use situation may not be substantially displayed within the corresponding display). In one or more implementations, the visual alert may comprise a pop-up graphic, a visual graphic that delineates the range of travel 408, 504 with respect to the remaining areas of the map 408, or the like. Further, in some configurations, the visual alert, the map 406, and/or other data associated with the end of use situation, may be presented in a three-dimensional format, utilizing 2D or 3D display technology. In some configurations, a head-up display (HUD) and/or a helmet-mounted display (HMD) may be utilized to present the visual alert, the map 406, and/or other data associated with the end of use situation 402 such as the range of travel 408.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the integrated avionics system 100 of FIGS. 1A and 1B and the CDU of FIG. 2 or the mobile electronic device 302 of FIG. 3 can be wired, wireless, or some combination thereof. In the case of a software implementation, for instance, the module represents executable instructions that perform specified tasks when executed on a processor, such as the processor 202 of the CDU shown in FIG. 2 or the processor 304 of the mobile electronic device 302 shown in FIG. 3. The program code can be stored in one or more device-readable storage media, an example of which is the memory 204 associated with the CDU 106 of FIG. 2 or the memory 306 associated with the mobile electronic device 302 of FIG. 3.

Example Methods

Figure 6:
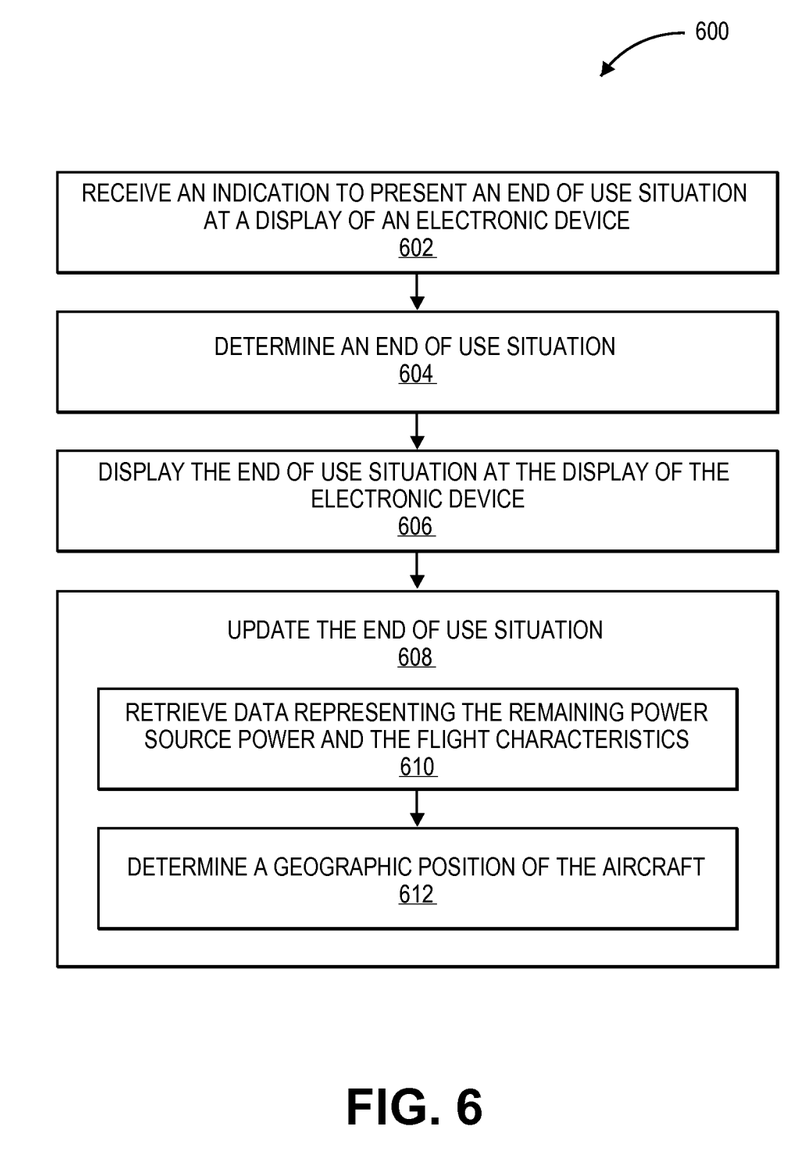
FIG. 6 is a flow diagram depicting a method in an example implementation in which an electronic device is configured to convey an end of use situation visualization conveying how far an aircraft can travel before the electronic device ceases operation due to loss of power.

FIG. 6 depicts a method 600 in an example implementation in which an end of use situation visualization is displayed via an electronic device, such as an avionics control and display unit (CDU) (e.g., the CDU 106 illustrated in FIGS. 1A through 2), the PFD 102, MFD 104, and/or the mobile electronic device (e.g., the mobile electronic device 302 illustrated in FIG. 3). As shown in FIG. 6, an indication is received to present an end of use situation at a display of an electronic device (Block 602). As described above, the range indicator module 214 is configured to cause generation and display of an end of use situation, such as the end of use situations illustrated in FIGS. 4A through 5. In one or more implementations, the module 214 is configured to cause a corresponding processor 202, 304 to generate and to display an end of use situation visualization at a display of an electronic device. The module 214 is configured to cause the generation and the display of the end of use situation in response to receiving an indication that a corresponding power source may cease to power the electronic device during operation of the aircraft. For example, the indication may be received at an electronic device indicating that a back-up power source is now powering the electronic device due to a loss of primary electrical power. In another example, the indication may be received at the electronic device indicating a battery can power the electronic device for a limited duration.

As shown in FIG. 6, an end of use situation is determined (Block 604) to provide a visual representation of when and/or where the mobile electronic device ceases to operate. The range indicator module 214 is configured to determine (e.g., generate) an end of use situation (e.g., end of use situation 402, end of use situation 502) based upon one or more flight characteristics as described above and/or the remaining power within the power source utilized to power the electronic device. Thus, the range indicator module 214 is configured to determine an end of use situation to depict a range of travel of the aircraft before the electronic device loses power. The end of use situation is displayed at the display of the electronic device (Block 606). As described above with respect to FIGS. 4A through 4C, the range indicator module 214 is configured to cause the display of navigation information 404, which includes a map 406, at the corresponding display of the electronic device. Upon determining the end of use situation, the module 214 is configured to cause display of the end of use situation at a display in communication with the electronic device. For example, as described above, a range of travel that conveys a visualization of the end of use situation may be displayed at the display 120 of the CDU 106 or the display 320 of the mobile electronic device 302.

In some configurations, a simple distance display, indicating the numerical value of the range of travel 408, may be utilized instead of, or in addition to, the map functionality described above. For example, a device lacking the ability to graphically present a map may still employ the techniques described herein the calculate the range of travel 408, or other data associated with the end of use situation 402, for simple display to the pilot independent of the map 406.

As the aircraft traverses the airspace, the end of use situation is updated (Block 608) to reflect changes in the end of use situation based upon the flight characteristics and power consumption of the electronic device. Data representing the flight characteristics and the remaining power source power are retrieved (Block 610). For instance, in the implementation illustrated, the range indicator module 214 is configured to retrieve data representing the remaining power within the power source (i.e., retrieve the remaining battery "life") and data representing flight characteristic information (e.g., an altitude of the aircraft, an airspeed of the aircraft, a flight plan of the aircraft, a Winds and Temperatures Aloft Forecast, a terrain height, a navigational input, etc.). The geographic position of the aircraft is determined (Block 612). For example, the geographic position of aircraft may be determined by the integrated avionics units that are in communication with the CDU 106 or the position-determining module 312 of the mobile electronic device 302. In an implementation, the range indicator module 214 is configured to cause a respective processor (i.e., processor 202, processor 304) to alter the display characteristics of the displayed range of travel (e.g., range of travel 408, range of travel 504) to account for the change in geographic position, the change in remaining power, or changes in flight characteristics of the aircraft.

CONCLUSION

Although the integrated avionics system 100 and the mobile electronic device 302 have been described with reference to example implementations illustrated in the attached drawing figures, it is noted that equivalents may be employed and substitutions made herein without departing from the scope of the invention as recited in the claims. Further, the integrated avionics system 100 and the mobile electronic device 302, including respective components, as illustrated and described herein are merely examples of a system and components that may be used to implement the present disclosure and may be replaced with other devices and components without departing from the scope of the present disclosure.

What is claimed is:
1. An electronic device comprising:
a display device;
a power source operable to furnish electrical power to the electronic device;
a memory operable to store at least one module;
at least one processor coupled to the display device and the memory, the at least one processor operable to execute the module to:
estimate a range of travel available before a loss of electrical power based on an estimated power of the power source and a flight characteristic of an aircraft associated with the electronic device, and
display, on the display device, navigation information including a map graphically representing the available range of travel.

2. The electronic device as recited in claim 1, wherein the power source is a back-up power source operable to furnish electrical power to the electronic device after failure or interruption of a primary power source.

3. The electronic device as recited in claim 2, wherein the back-up power source includes a battery.

4. The electronic device as recited in claim 1, wherein the one or more modules are configured to cause the one or more processors to alter a display attribute of the navigation information to convey the range of travel until the electronic device at least substantially ceases operation due to loss of power.

5. The electronic device as recited in claim 4, wherein a first area of the map graphic comprises a first display attribute to represent the range of travel and a second area of the map graphic comprises a second display attribute to represent areas outside the range of travel, the first display attribute different from the second display attribute.

6. The electronic device as recited in claim 1, further including a satellite navigation receiver operable to determine a geographic position of the electronic device, wherein the processor is further operable to estimate the range of travel based upon the determined geographic position of the device.

7. The electronic device as recited in claim 1, wherein the flight characteristic comprises at least one of an altitude of the aircraft, an airspeed of the aircraft, a flight plan of the aircraft, a Winds and Temperatures Aloft Forecast, a terrain height, or a navigational input of the aircraft.

8. An electronic device comprising:
a display device;
a satellite navigation receiver operable to determine a geographic position of the electronic device;
a memory operable to store at least one module;
a processor coupled to the display device and the memory; and
a back-up power source operable to provide electrical power to the display device, memory, and processor after failure of a primary power source,
wherein the processor is operable to execute the module to:
estimate a range of travel available based upon an estimated power of the back-up power source, the determined geographic position of the electronic device, and a flight characteristic of an aircraft associated with the electronic device, and display, on the display device, navigation information including a map graphically representing the available range of travel.

9. The electronic device as recited in claim 8, wherein the flight characteristic comprises at least one of an altitude of the aircraft, an airspeed of the aircraft, a flight plan of the aircraft, a winds aloft forecast, a winds aloft calculation, a terrain height, topography, topography, or a navigational input of the aircraft.

10. The electronic device as recited in claim 8, wherein the one or more modules are configured to cause the one or more processors to alter a display attribute of the navigation information to convey the range of travel until the electronic device at least substantially ceases operation due to loss of power.

11. The electronic device as recited in claim 10, wherein a first area of the map graphic comprises a first display attribute to represent the range of travel and a second area of the map graphic comprises a second display attribute to represent areas outside the range of travel, the first display attribute different from the second display attribute.

12. The electronic device as recited in claim 8, wherein the display device, memory, processor, and back-up power source are incorporated into a cockpit of the aircraft.

13. The electronic device as recited in claim 8, wherein the display device, memory, processor, and back-up power source are incorporated into a portable housing.

14. The electronic device as recited in claim 8, wherein the back-up power source automatically provides electrical power to the display device, the memory and the processor once the primary power source fails to provide electrical power to the display device, the memory and the processor.

15. The electronic device as recited in claim 8, wherein the back-up power source includes a battery and the estimated range of travel is based upon the estimated remaining power of the battery.

16. A method comprising:

causing, using a processor, navigation information to be displayed at a display device of an electronic device, the navigation information including a map graphic representing an area being traversed by the electronic device, the electronic device powered by a power source;

monitoring, using the processor, a remaining power of the power source; and estimating, using the processor, a range of travel available before a loss of electrical power from the power source based on the remaining power of the power source and a flight characteristic of an aircraft associated with the electronic device;

altering, using the processor, a display attribute of the map to graphically represent the available range of travel; and updating, using the processor, the estimate of the available range of travel based upon remaining power of the power source.

17. The method as recited in claim 16, wherein the remaining power of the power source is reduced as available power is consumed.

18. The method as recited in claim 17, wherein the flight characteristic comprises at least one of an altitude of the aircraft, an airspeed of the aircraft, a flight plan of the aircraft, a winds aloft forecast, a winds aloft calculation, a terrain height, topography, or a navigational input of the aircraft.

19. The method as recited in claim 16, wherein the navigation information includes a first area represented by a first display attribute indicating the range of travel of the electronic device and a second area represented by a second display attribute indicating areas outside the available range of travel, the first display attribute different from the second display attribute.

20. The method as recited in claim 16, wherein the power source includes a battery and functions as a backup to a primary power source and the display attribute of the map is altered in response to a failure or interruption of the primary power source.

21. The method as recited in claim 16, further comprising updating the estimate of the available range of travel based on the flight characteristic of the aircraft associated with the electronic device.

22. The electronic device as recited in claim 1, wherein the estimated power of the power source is measured or calculated.

23. The electronic device as recited in claim 8, wherein the estimated power of the back-up power source is measured or calculated.

24. The method as recited in claim 16, wherein monitoring the remaining power of the power source comprises measuring or calculating, using the processor, the remaining power of the power source.

* * * * *